June 28, 1955   E. T. C. BRINTON   2,711,777
MANUFACTURE OF TUFTED FABRICS
Filed Aug. 22, 1951   9 Sheets-Sheet 1

Inventor
ESME TATTON
CECIL BRINTON,
By
Attorney

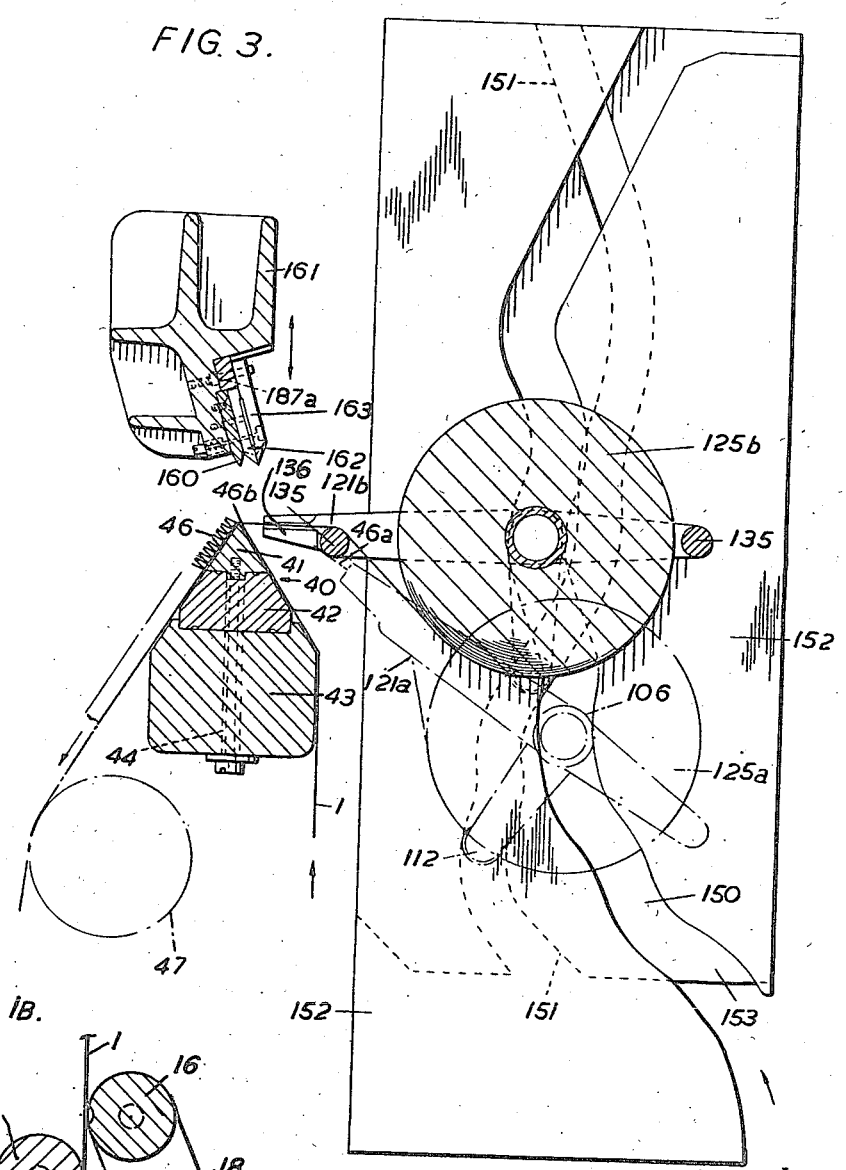
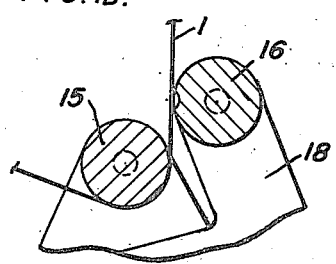
FIG. 3.
FIG. 1B.

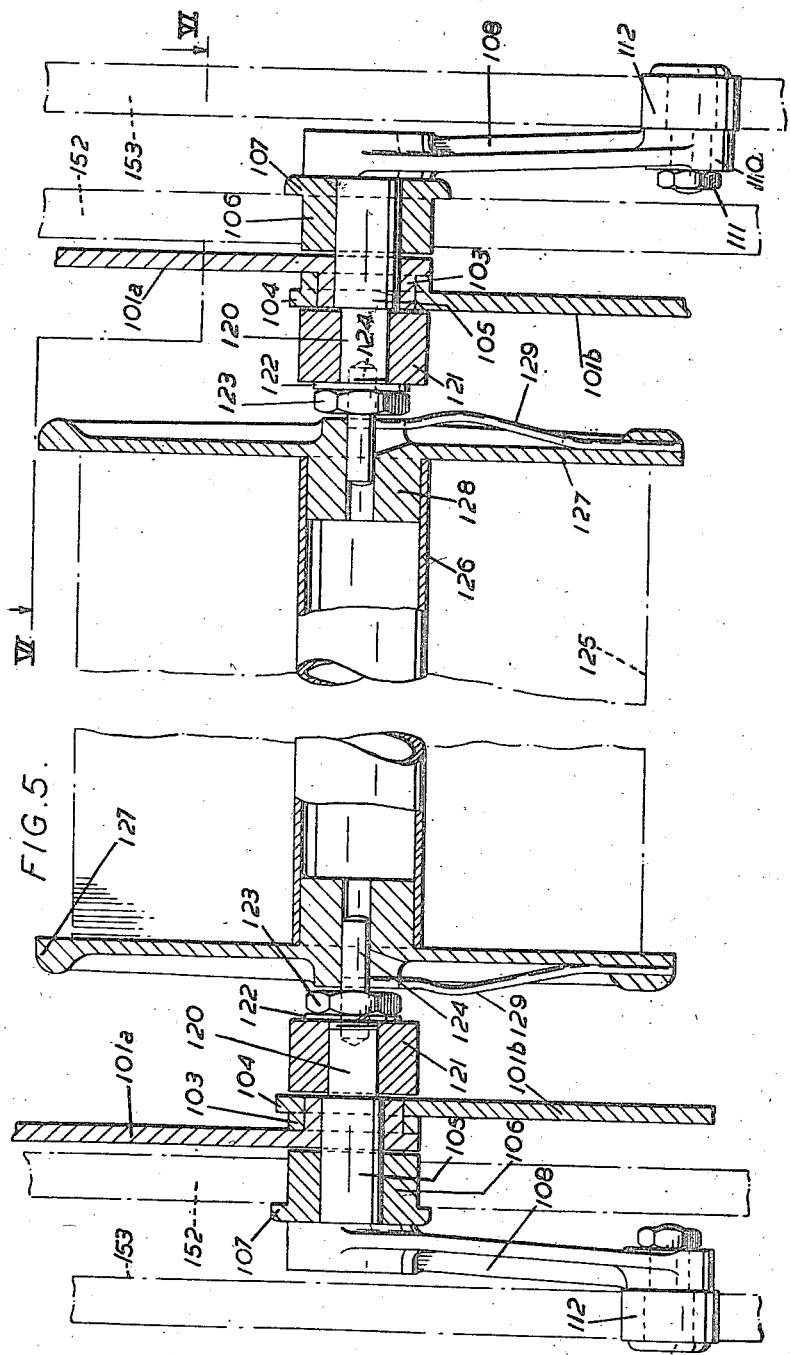

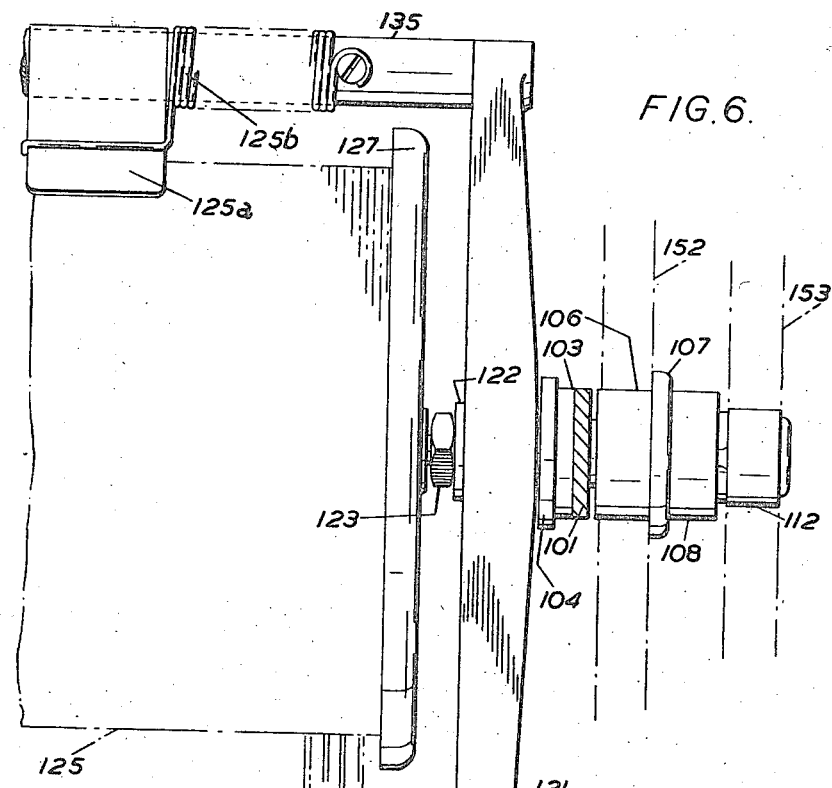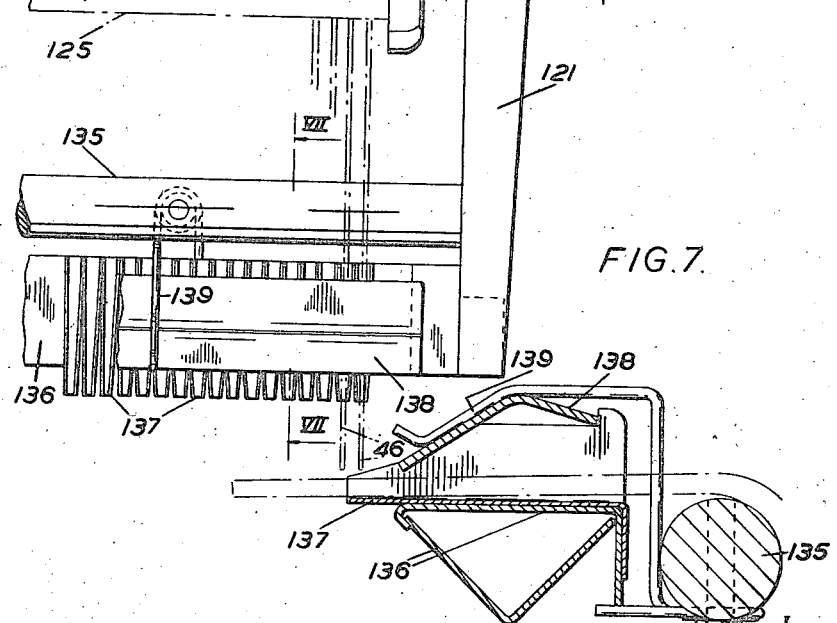

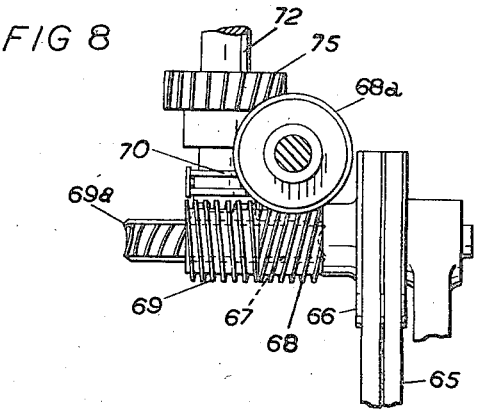
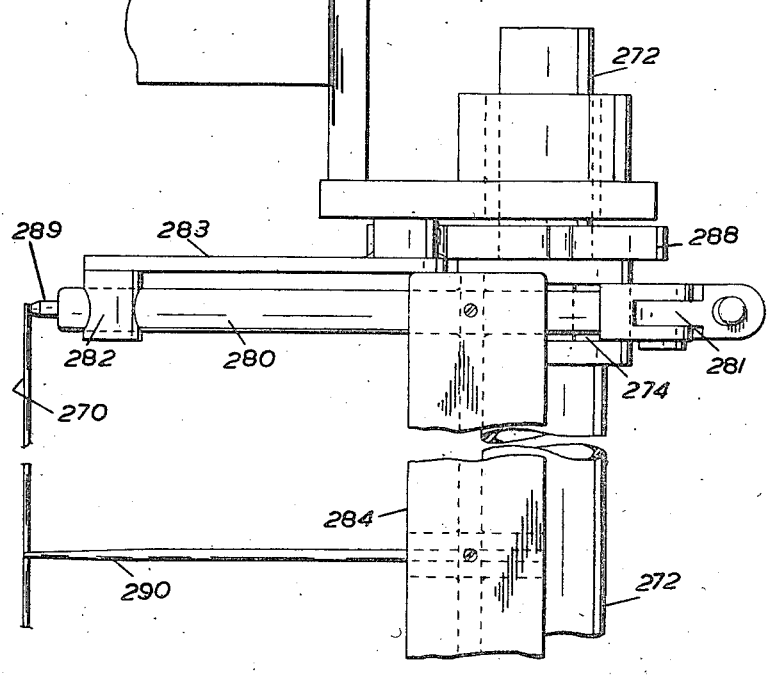

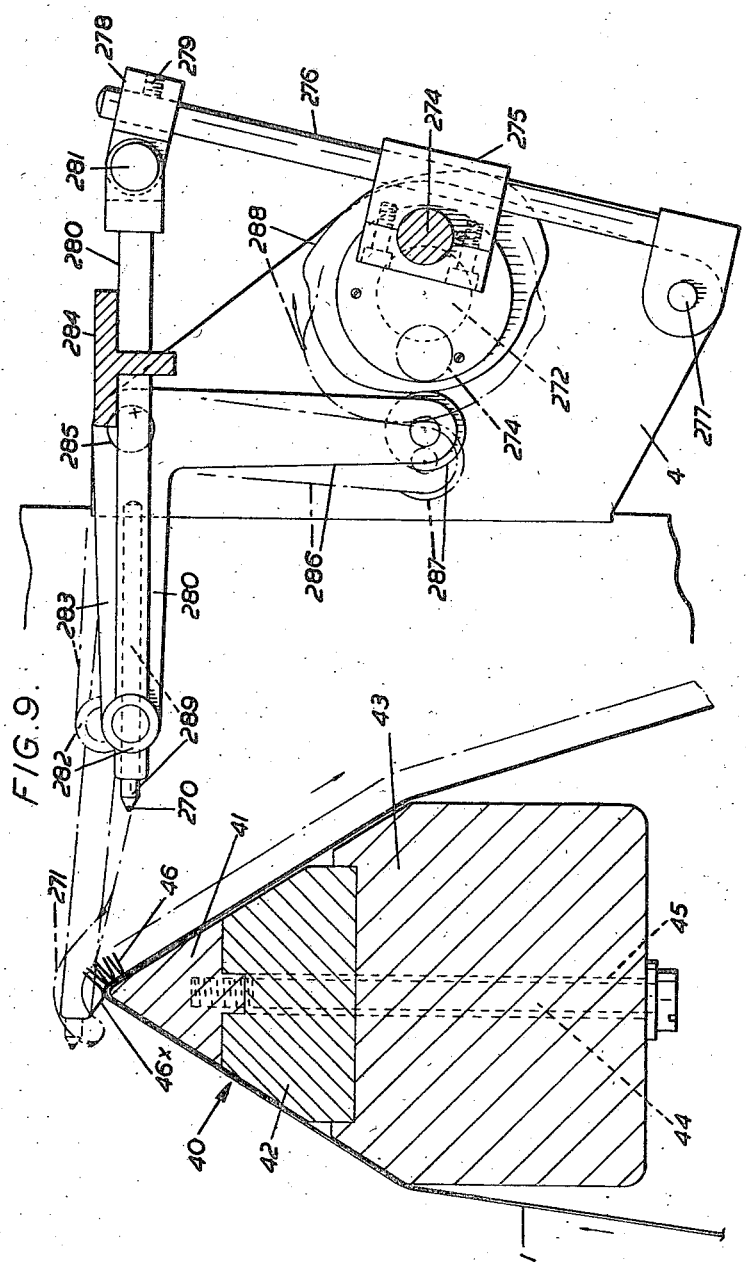

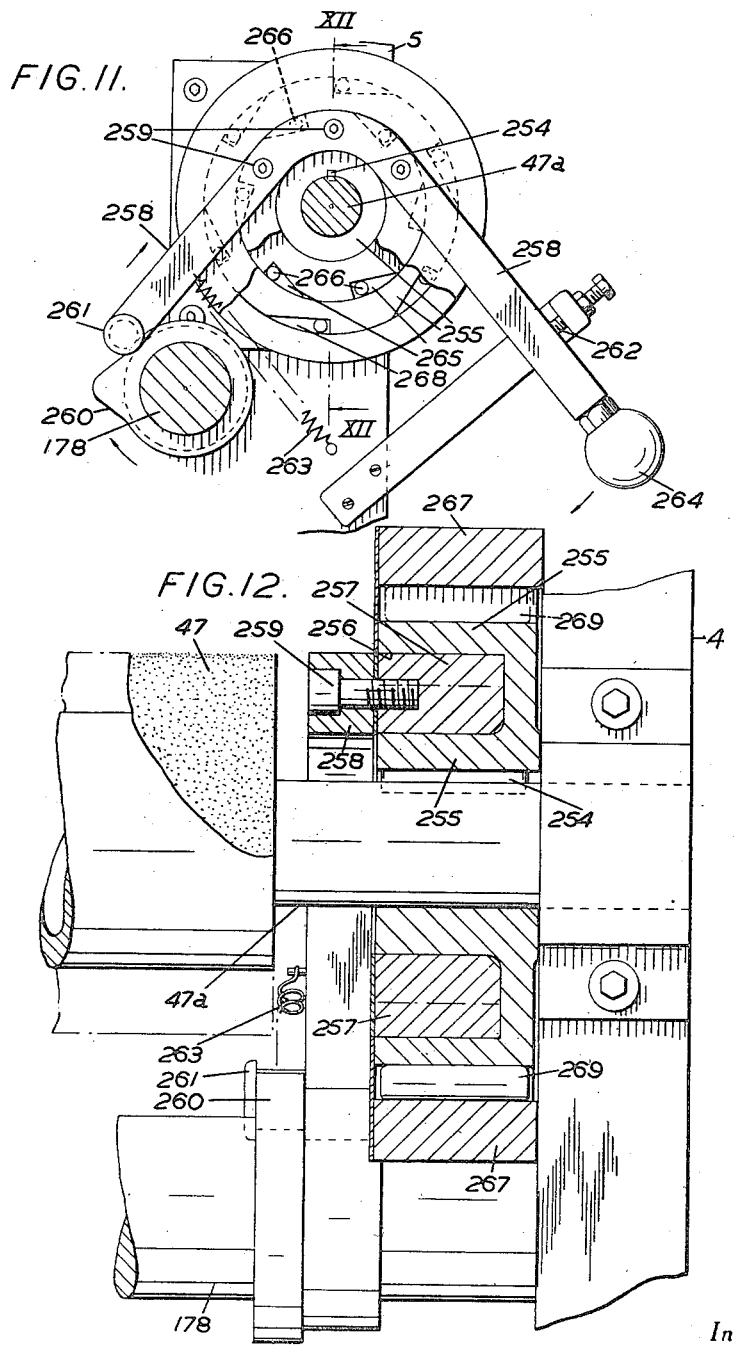

United States Patent Office 2,711,777
Patented June 28, 1955

2,711,777
MANUFACTURE OF TUFTED FABRICS

Esme Tatton Cecil Brinton, Kidderminster, England, assignor to Brintons Limited, Kidderminster, England, a British company Application August 22, 1951, Serial No. 243,130

8 Claims. (Cl. 154—1.1)

This invention relates to the manufacture of tufted carpets such as those of the Axminster type, and similar tufted fabrics, and is particularly concerned with a method of manufacture in which the tufts constituting the pile of the fabric are secured to a sheet-like backing having a surface layer of adhesive, instead of being woven into the backing as is done in the conventional form of carpet loom.

Such a method of manufacture in which the adhesive is rendered effective by means of a dielectric heating process is described in the specification of British Patent 656,525. One of the principal advantages of the process is the high speed with which the fabric can be produced. However, in order to take advantage of the extremely short time in which a row of tufts can be secured to the backing, it is necessary to provide a mechanism for producing rows of tufts at a comparable speed. The two main forms of mechanism for producing rows of tufts in an ordinary Axminster loom either consist of grippers, usually co-operating with a differential-lift jacquard to give the fabric its pattern, or spools carried by a spool-chain and giving the fabric its pattern by means of the winding of yarn of varying colours on successive spools in the chain. Each of these forms of mechanism has its attendant advantages and disadvantages which are well known.

Now, although it is possible for a gripper mechanism to work at high speeds, as is the case with the form of mechanism described in U. S. Patent No. 2,539,180, no such comparable speeds have been possible with a spool mechanism.

The spools used for this purpose are each wound with a number of lengths of yarn corresponding to the number of tufts in the width of the fabric and of colours corresponding to the pattern. Each yarn on the spool is led through a narrow tube or its equivalent and projects slightly beyond the end of the tube to form a tuft, so that the row of tufts is spaced away from the body of the spool by the length of the tubes. In order to insert the row of tufts in the fabric, the chain has had to be stopped, the spool lifted out mechanically and passed through a series of complex movements serving to insert the tufts between the warp threads, to hold the tufts in position for anchoring by the weft thread, to draw out a fresh length of tuft and allow the anchored row of tufts to be severed, and the spool has then to be replaced in the chain before the latter can move forward a further step. Owing to the inertia of the moving parts, it proves impossible to move a spool through such a succession of steps quickly enough to produce more than about 30 rows of tufts per minute for a 27 inch loom. A speed considerably greater than this is desirable, not only in a process where the tufts are secured to a backing, but also in a conventional form of carpet weaving process.

According to the invention, therefore, in order to enable a desirable speed to be attained, a row of tufts is caused to pass through the necessary sequence of movements to enable it to be embodied in the fabric, by bodily displacing the chain without removal of the spool from the chain. Preferably, these movements are obtained without stopping the chain, by providing for a combination of bodily lateral displacement of the chain, together with angular displacement of the ends of the tufts relatively to the chain. Since the row of tufts is spaced away from the body of the spool, this combination of movements can be employed to produce any desired resultant movement of the tufts.

The two component movements may be obtained in practice by providing each spool with a follower working in a guide track to produce the lateral displacement of the chain and with a radial arm fitted with a follower working in a second guide track so as to produce the angular displacement of the spool relatively to the chain. Movement of the chain then causes these two followers to move along their respective guide tracks so as to produce the desired component movements.

If the tufts are to be secured to a sheet-like backing in the manner referred to above, the guide tracks may be shaped to produce a continuous movement resulting in the carrying out of the operations of laying the row of tufts on the coated backing until the tufts and backing are gripped between a pair of electrodes serving to secure the tufts in position, moving the spool away from the line of contact or bite of the electrodes while these remain in position so as to unwind a further length of yarn to constitute the next row of tufts, and then moving the spool in an arc of a circle to keep the length of the yarns constant while they are severed.

A mechanism operating with this sequence of operations will now be described, in greater detail, by way of example, with reference to the accompanying drawings, in which:

Fig. 1A is a detail view of a part of Fig. 1 showing the adjustable casting on the push rod;

Fig. 1B is a detail view of a part of Fig. 1 showing the groove in the spreader;

Figures 3 and 4 are views showing a spool in successive different positions during its movement necessary for embodying a row of tufts in the carpet (adjacent spools being omitted for the sake of clarity);

Figure 5 is an elevation of the spool and its mounting;

Figure 6 is a sectional plan taken on the line VI—VI in Figure 5; while

Figure 7 is a section of the gate mounting taken on the line VII—VII in Figure 6;

Figure 8 is an elevation of a detail of the driving gearing taken on the line VIII—VIII in Figure 1;

Figure 9 is an elevation partly in section showing in detail the operating mechanism for the tuft rake; while Figure 10 is a plan of the parts shown in Figure 9;

Figure 11 is an elevation of the step-by-step driving mechanism for the take-up roll for the finished carpet; and Figure 12 is a section to a larger scale taken on the line XII—XII in Figure 11.

Figure 1:
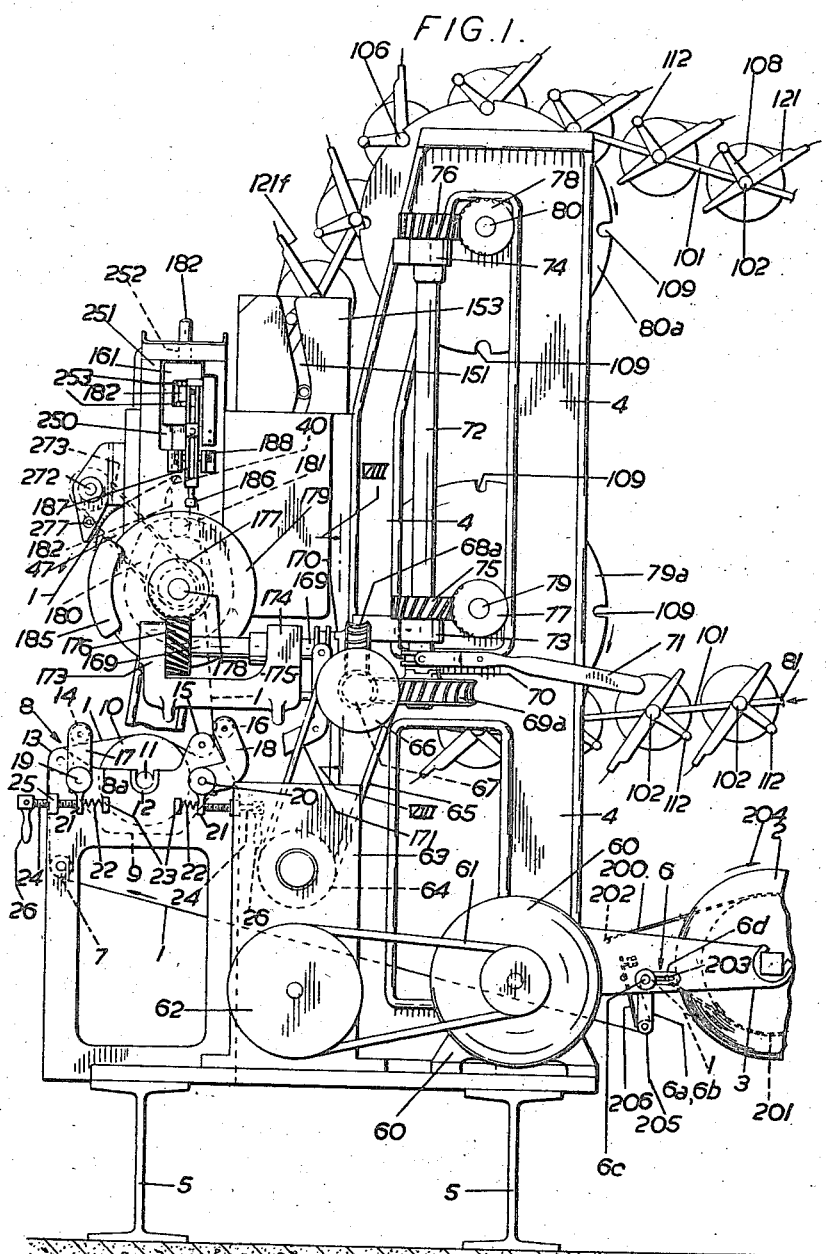
Figure 1 is a general side elevation showing the operative parts of the mechanism, the main length of the spool chain being broken away for purposes of illustration.

Referring first to Figure 1, a width of hessian 1 is drawn off from a beam 2 turning in a pair of brackets 3, secured to the main frame 4 of the machine, which is supported on joists 5. The hessian band is drawn off through a constant tension let-off device 6 and thence round a guide roller 7 to a coating apparatus indicated generally at 8. The let-off device 6 comprises a pair of radial arms 6a, 6b spaced apart on opposite sides of the hessian band 1 by a pivot rod 6c extending between the two brackets 3. A brake band 200 embraces a brake drum 201 fixed to the beam 2 and the band is secured at one end to a fixed anchor 202 on one of the brackets 3 and at the other end to an anchor 203 adjustable in a slot in a horizontal arm 6d fixed to the pivot rod 6c. The hessian band 1 is drawn off from the bottom of the beam 2 so that the latter turns clockwise as shown by the arrow 204. The hessian band 1 then passes over the pivot rod 6c and then passes around a spindle 205 arranged to turn on V-centres on the inside of the radial arms 6a, 6b. Thus the tension in the hessian band 1 tends to turn the radial arms 6a, 6b clockwise as seen in Figure 1 but the tension is counteracted by the pressure of a pair of flat springs 206 bearing on the radial arms 6a, 6b. If owing to the demand, the tension in the hessian band 1 increases, it overcomes the springs 206 and turns the radial arms 6a, 6b somewhat clockwise. This obviously slackens the brake bands 200 a little to equalize the tension in the hessian. On the other hand, if the hessian becomes slack, the springs 206 preponderate and the brake band 200 is tightened and thus the tension in the hessian band 1 increased and restored.

The coating apparatus 8 comprises a trough 9 partially filled with the adhesive to be used, for example, polyvinyl chloride, and a roller 10 having a central shaft 11 turning in open bearings 12 situated at each end of the trough 9. The roller 10 dips into the adhesive and transfers a thin layer to the hessian band 1 as it passes over it. For this purpose, the hessian band 1 passes around a guide roller 13, under a roller 14, across an arc of the surface of the roller 10, around a further guide roller 15 and past a non-rotatable spreader bar 16. The roller 14 is adjustable to regulate the arc of contact of the hessian band 1 with the adhesive applying roller 10. In fact, the roller 14 and spreader 16 are mounted in arms 17 and 18 pivoted respectively at 19 and 20 in the side frames 8a of the coating apparatus 8. Arms 21 located outside the side frames 8a at each end are acted on by compression springs 22, which at their other ends, abut against fixed stops 23. These springs 22 provide a resilient loading for the roller 14 and spreader 16, and press the latter into contact with the hessian band 1. The movements of the arms 21 are controlled by screwed spindles 24 which are threaded into tapped blocks 25 and are provided with adjusting handles 26. By adjustment of the screwed rods 24, the range of movement of the rollers 14 and 16 can be correspondingly adjusted. As the hessian band moves forwardly over the roller 10, it causes the latter to rotate and to pick up a continuous layer of adhesive which is transferred to the hessian. The spreader 16 is formed with a single longitudinal flute or groove to exert the spreading action on the adhesive.

Figure 4:
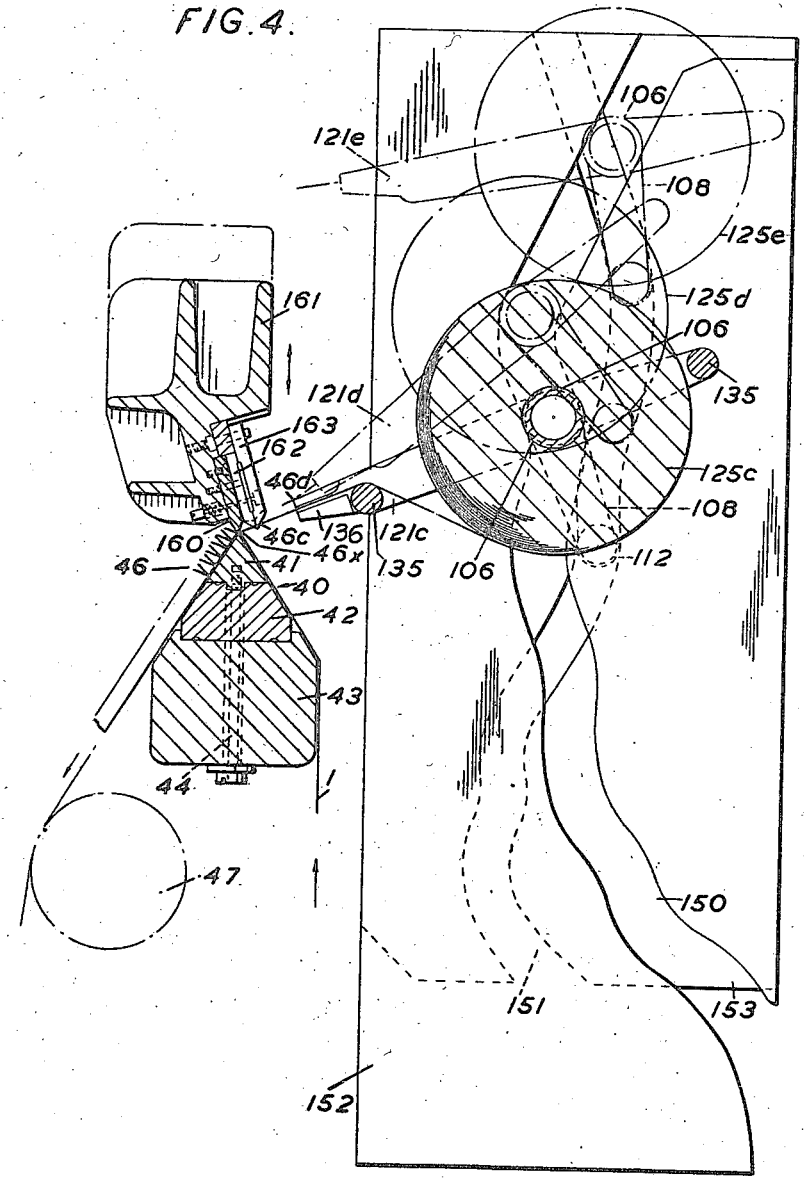

After leaving the coating device 8, the hessian band 1 moves upwardly in an approximately vertical direction and passes over a fixed electrode 40, shown in outline only in Figure 1, and in greater detail in Figures 3 and 4. This electrode 40, when seen in vertical section, has the form of an inverted V and consists of a correspondingly shaped length of brass 41 mounted on a ceramic insulator 42 held in position in a casting 43 forming part of the frame of the machine by means of bolts 44 passing through clearance holes in the casting 43. In passing over the tip of the fixed electrode 40, the hessian band 1 has successive rows of tufts 46 secured to it as will be described in detail later, and these successive rows of tufts then constitute the pile of the carpet. The hessian band 1 then passes downwardly on the other side of the electrode 40 to a take-up roll 47, part of which is seen in Figure 1, and which is shown in more detail in Figure 2. This take-up roll 47 is driven in step-by-step fashion and is provided with a spiked surface to provide a positive drive to the hessian band 1, which is thus advanced in a series of steps equal to the pitch of the rows of tufts. After passing in contact with the periphery of the take-up roll 47, the carpet then passes to a hand-operated storage beam (not shown in the drawings).

The drive for the whole machine is derived from an electric motor 60 coupled by a belt 61 to the input pulley 62 of a variable speed gear box shown in outline at 63. The output shaft 64 of the gear box 63 is coupled by a clutch 64a (Fig. 2) to the output pulley 64b which drives by a belt 65 a pulley 66 pinned to a shaft to which are fixed worms 68, 69. The worms 68, 69 drive respectively worm wheels 68a, 69a. The worm gear 69a is connected by way of a dog clutch 70 provided with an operating lever 71 to a vertical shaft 72 journalled in bearings 73 and 74 on the main frame 4 of the machine. The shaft 72 is provided with spiral gear wheels 75 and 76 meshing with gear wheels 77 and 78 secured respectively to the shafts 79, 80 of sprockets 79a and 80a, which provide the main drive to the spool chain indicated generally at 81. The length of the spool chain will depend on the pattern of the carpet to be produced, and as the length varies so the idle portion of the chain will pass over any convenient number of idler sprockets situated at intervals, so that the chain is spread out either vertically or horizontally in the usual fashion.

The chain is made up of links 101 on either side of the spools and pivoted together at 102 and details of the construction are best seen in Figure 5. The links are arranged to inter-fit by the provision of a boss 103 on one link 101a, engaging a bore in a boss 104 of larger diameter on the adjacent link 101b. The boss 103 is formed with a central bore through which a spindle 105 passes and which thus acts as a pivot pin. Outside the links 101, the pin 105 is fitted with a roller 106 formed with a flange 107 and a radial arm 108 is integral with the pin 105. The rollers 106 at the joints between links 101 engage with the notches 109 formed in the sprocket wheels 79a and 80a, and the drive is thereby transmitted to the spool chain 81. The rollers 106 also serve as cam followers in a manner to be described later. The radial arm 108 is formed at its outer end with a boss 110, to which is secured, by means of a bolt 111, a roller 112, also serving as a cam follower in a manner similar to the roller 106.

On the inner side of the links 101, each of the spindles 105 is formed with a part of reduced diameter 120 to carry a gate arm 121 which is secured to the spindle 105 by a taper pin passing through the part 120 and by a lock nut 123 provided with a washer 122. The opposite gate arms 121 are rigidly connected together by the gate mounting 136 and two transverse rods 135 (Fig. 6) extending between them parallel to the axis of the spool 125. The spool 125 comprises a hollow tubular barrel 126 to which end flange 127 are secured. At each end, a plug 128 integral with the flange 127 fits the bore of the barrel 126 and the plugs 128 are provided with central bores in which pivot studs 124 are housed. The pivot studs 124 are retained by springs 129 which load them outwards and also fit into holes drilled centrally in the reduced parts 120 of the spindles 105. Free rotaion of the spool 125 on the pivot studs 124 is checked by a braking plate 125a pivotally mounted on one of the transverse rods 135 and pressed against the yarn on the spool 125 by a coiled wire spring 125b encircling that rod 135.

The spool 125 is wound with a number of separate lengths of yarn corresponding to the number of tufts 46 required in the width of the carpet. Each length of yarn is led off from the spool through a duct 137 in the gate, which corresponds to the tube employed on a conventional spool loom. This gate, as seen in Figures 6 and 7, consists of a mount 136 on to which are soldered the ducts 137 of channel form which allows the separate yarns to be simply laid in the ducts and then a full length cover 138 is placed over them and held in position by a wire spring 139.

Thus it will be understood that each spool is pivotally held between opposite pairs of spindles 105 and the gate arms 121 have their angular position determined by that of the corresponding radial arms 108.

The gear wheels 77 and 78 are continuously driven as long as the dog clutch 70 is in engagement and thus the chain 81 moves steadily round its closed path. After passing around the lower driving sprocket 79a, each spool has its motion controlled by guide tracks or grooves 150 and 151 provided in plates 152 and 153 respectively, which are duplicated on each side of the machine, as seen in Figure 5. The plate 153 lies outside the plate 152 on each side so that the roller 112 on the radial arm 108 of each spool engages in and travels along the guide track 151, while the roller 106 engages in and travels along the guide track 150. As the follower rollers 106, 112 enter the respective guide tracks 150, 151, the gate arm 121 is directed upwardly in the position shown at 121a in chain lines in Figure 3, and as the spool 125 moves upwardly in a generally vertical direction with the gate 136 as a unit so the row of projecting tufts moves upwardly alongside the vertical reach of the coated hessian band 1. Soon after the position 125a of the spool is reached, the guide track 151 approaches the track 150 so that the radial arms 108 are rocked in an anti-clockwise direction until the position of the gate arm 121 shown in full lines at 121b is reached. The combination of the anti-clockwise movement of the radial arms 108 and thus of the gate arm 121, together with the general upward movement of the spool 125, first produces a movement of the row of tufts 46 to the left in Figure 3 from the position 46a to the position 46b in which they are substantially horizontal. Then, while the tufts 46 are in that horizontal position, the two component movements are in almost exact opposition so that a slight dwell is produced in that position.

While the row of tufts 46 is held in position in contact with the hession band 1, an upper electrode 160 decends into contact with it to secure it in position. This electrode 160 comprises a narrow brass blade held in position in a casting 161. The blade is sandwiched between its seating in the casting 161 and the movable blade 162 of a shearing device of the kind disclosed in British Patent No. 624,882, the fixed blade of which is shown at 163. The electrode assembly comprising the casting 161, together with the associated electrode 160 and the shearing device 162, 163 is mounted to rise and fall on push rods 182 seen in Figures 1 and 2. The two blades 162, 163 of the shearing device each comprises a number of cutting teeth, one for each tuft in the row, arranged in a comb-like fashion, all as disclosed in detail in the aforesaid British Patent No. 624,882. In its normal position, the movable blade 162 lies so that its teeth are in alignment with corresponding teeth in the fixed blade 163, thus allowing tufts to move up into the gaps between the cutting teeth. When the moving member is caused to reciprocate along its length, the tufts located in the gaps are sheared off, one by each pair of teeth.

As the electrode 160 descends into contact with the row of tufts 46 held in contact with the hessian band 1 on the lower electrode 40, a high frequency voltage is applied between the two electrodes. The dielectric heating effect thereby produced in the adhesive causes the latter to gel or set so that the row of tufts 46 is firmly anchored in position. At the same time, the electrode 160 compresses the row of tufts 46 into close engagement with the hessian.

As can be appreciated from Figures 3, 4 and 9 particularly, when the tuft has been fixed to the backing 1 and has been sheared, it takes up an open V configuration with one end as seen at 46x in Figures 4 and 9 standing at an angle to the previously secured tufts 46. It will, of course, be appreciated that in Figure 9, the fixed electrode 40 and the hessian backing 1 is viewed from the opposite side to Figures 3 and 4. The angularly displaced limb 46x of the tuft last laid is liable to stand in the way of the next tuft to be presented and so a rake mechanism is provided to rake or brush the last limb 46x into its proper desired position against the other limb of the same tuft. The raking tool is a wire 270 extending across the machine along the whole set of yarns. The mechanism for operating it will be described in detail later but here it may be mentioned that the wire 270 is caused to make a cycle of movement along a path of the shape shown at 271, at every cycle of the machine. Thus the wire 270 is moved forward and over the tufts 46 already fixed to the backing and is then lowered at the back and returned so as to engage the limb 46x of the last tuft soon after it has been severed and to rake it into its desired position in contact with the other limb of the same tuft.

While the heating operation is continuing, movement of the spool 125 is also proceeding and the next stage in its travel is shown in full lines in Figure 4 at 125c. It will be seen that the general line of the gate arm 121 is directed towards the point of anchorage of the row of tufts 46, but the gate 136 itself is moving away upwardly and to the right. This has the effect of causing a further length of yarn to be withdrawn from the spool 125, and owing to the fact that the gate 136 is directed towards the point of anchorage, a straight pull-out is ensured. At the same time, the yarns are moved upwardly into the gaps between the comb-like teeth of the shearing device as is clearly shown at 46c. This motion is continued until a length of yarn has been withdrawn equal to the length of the tufts constituting the next row. By this time, the yarns have reached the roots of the teeth of the shearing device and, at this instant, the shearing device comes into action to sever the row of tufts.

The shearing operation is practically instantaneous, but it does nevertheless occupy a small fraction of a second, and during this time, movement of the spool 125 is still continuing. To ensure, therefore, that no further yarn is withdrawn from the spool 125 during the interval, the path of travel of the gate arm 121 at this time is an arc of a circle having its centre at the point of shearing.

At the next position of the spool at 125d, the yarns 46d shortly after severing have moved through an arc of a circle as just described. Following this, the spool continues its upward movement into the position shown at 125e with the gate arm at 121e beginning to rise to its neutral position as when the spool entered the guide tracks 150 and 151. The final part of the motion as the spool 125 leaves these guide tracks consists in the gate arm 121 swinging upwardly into the position shown at 121f seen in Figure 1, and it then remains in this position for the whole of the circuit until re-entering the guide tracks again. It is held in this position by means of a spring latch not shown in the drawing but which may consist of a spring-pressed steel ball seated in each of the gate arms 121 and engaging the adjacent chain link 101 or vice versa. Such ball could engage the boss 104 on the link 101 seen in Figure 5.

Figure 2:
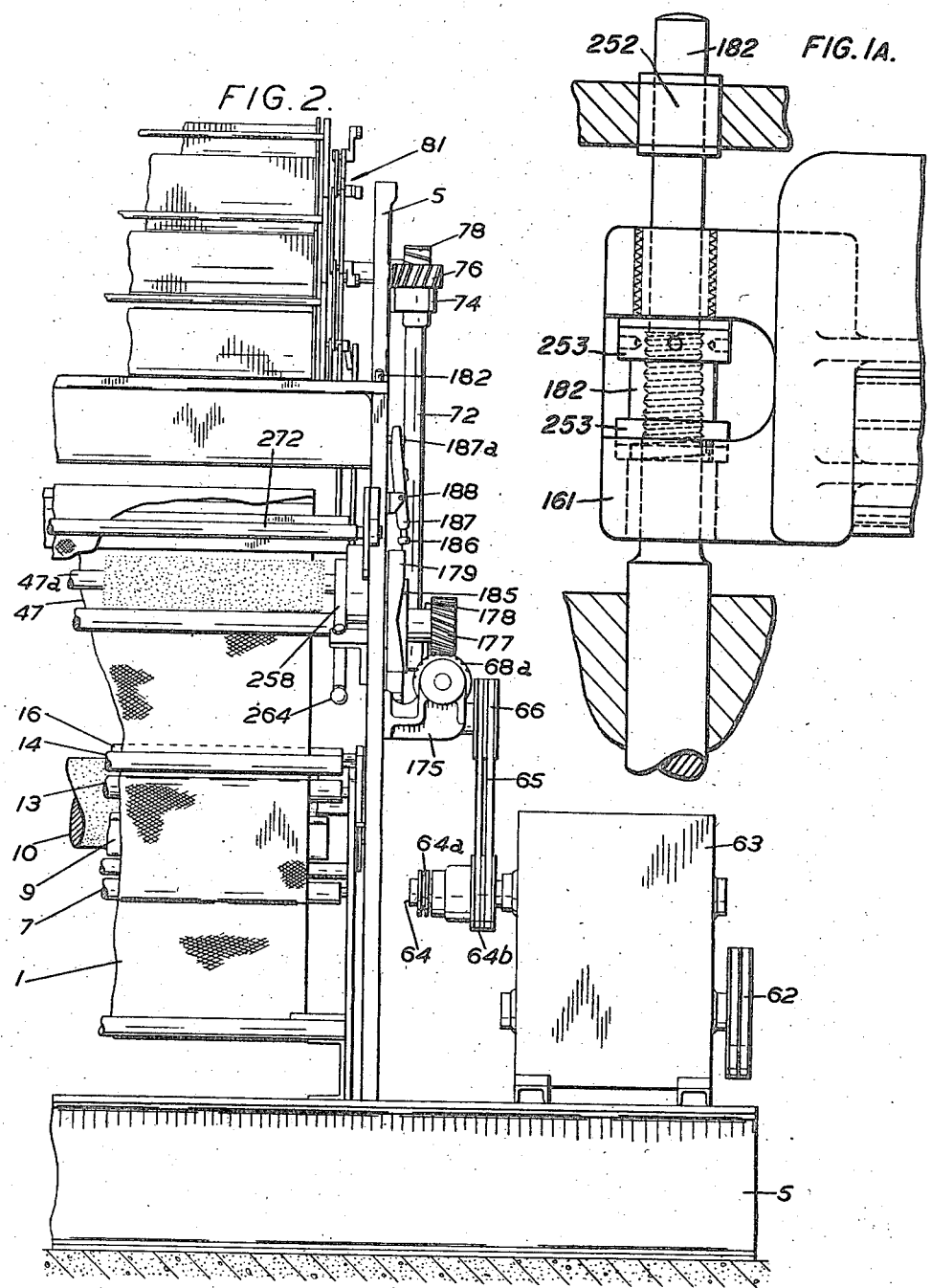
Figure 2 is a front elevation of the right-hand side of the mechanism, the remainder being broken away.

The movements of the co-operating parts of the machine necessary for the operations just described are transmitted from the worm 68 on the shaft 67 which meshes with the worm wheel 68a. The latter drives a shaft 169 through a dog clutch 170 operated by a lever 171. The shaft 169 is mounted in bearings 173 and 174 carried in a U-shaped bracket 175 mounted on the main frame 4 of the machine. The shaft 169 carries a spiral gear wheel 176 meshing with a corresponding gearwheel 177 fixed to a shaft 178. This shaft extends across the width of the machine and carries at each end a rotary cam, one of which is shown at 179 (Figures 1 and 2). These cams provide the reciprocatory motion both for the upper electrode assembly and for the moving member of the shearing device.

The first of these motions is produced by a cam track 180 on the rear face of the cam 179 as seen in Figure 1. Co-operating with this track is a cam follower 181 mounted at the end of a push rod 182 connected at each end of the machine to the casting 161 and guided in brackets 251 at either end of the machine. The casting 161 carrying the upper electrode 160 and seen in Figures 3 and 4, has the section at its two ends as shown in Figure 1. Rectangular apertures 250 in end brackets 251 afford clearance for the ends of the casting 161 carrying the moving electrode which is thus able to execute its up and down movement. The push rods 182 extend upwards from the cam tracks 180, and are screw-threaded at the parts where they pass through the upper electrode casting 161 and each rod bears two nuts 253 within the recess in the casting 161. These nuts afford a means of adjusting the electrode casting 161 relatively to the push rods 182 and also serve to secure the casting 161 to the push rods 182. In the position shown in Figure 1, the electrode assembly is in its upper position corresponding with that shown in Figure 3. As the cam 179 rotates, however, the follower 181 moves into a portion of the track 180 closer to the shaft 178 and is thereby drawn downwardly to bring the upper electrode 160 into engagement with the hessian 1 as shown in Figure 4. The necessary dwell in this position is produced by the fact that the contour of the guide track at this point is concentric with the shaft 178.

The cam 179 also carries a cam plate 185, the shape of which is best seen in Figure 2. This plate has its greatest thickness over its central portion and tapers uniformly towards its two ends over its inner face. The cam plate 185 co-operates with a rotary follower 186 mounted on the end of a lever 187 pivoted at 188 and connected at its upper end to the pull rod 187a operating the movable blade 162 of the shearing device as in British Patent No. 624,882. Thus, as the cam plate 185 passes the follower 186 during the course of the rotation of the member 179, the lever 187 is rocked abruptly to produce the necessary movement of the movable blade of the shearing device to sever the yarns. The push rod 187a is returned by a similar lever at the other side of the machine. These movements are synchronised in such a way that the cam 179 makes one complete revolution during the time in which one spool moves into the position occupied by the previous one, and it is adjusted so that the upper electrode 160 descends just as the row of tufts 44 is led on to the hessian 1, while the shearing device comes into action shortly afterwards as soon as the fresh length of yarn has been withdrawn from the spool. The generator providing the high frequency voltage between the two electrodes is not shown in the drawings, but it is triggered by a cam, not shown, mounted within the frame of the machine, on the shaft 178 to operate a suitable switch to control the supply of high frequency current.

The step-by-step driving mechanism for the take-up roll 47 is shown in detail in Figures 11 and 12. The take-up roll 47 is fixed on a shaft 47a to which is keyed at 254 a disc 255 machined with a deep annular recess 256. Fitted in this recess is a driving ring 257 to the front of which a driving piece 258 is fixed by three studs 259. The driving piece 258 and driving ring 257 are rocked about the axis of the shaft 47a, once in each revolution of the shaft 178 by a cam 260 on that shaft engaging a follower roller 261 mounted on the end of the driving piece 258. The piece 258 is drawn back against a fixed stop 262 by a tension spring 263. If necessary, the piece 258 can be rocked by hand by the handle 264. The disc 255 is driven clockwise through one step at each stroke of the driving ring 257 through the medium of a ratchet clutch of the wedged roller type and consisting of a number of wedge notches 265 in the periphery of the driving ring 257 and each housing a driving roller 266. In order to check any backward rotation of the disc 255 or the take-up roll 47, an outer fixed check ring 267 is carried by the frame standard 4. A number of wedge notches 268 oppositely directed to the notches 265, are formed in the periphery of the disc 255 and house check rollers 269 and these act as ratchets preventing backward rotation of the disc 255 and the attached parts.

As already indicated, the mechanism for operating the raking mechanism for the freshly applied tufts is shown in detail in Figures 9 and 10. A shaft 272 is driven from the shaft 178 by a sprocket chain 273 so as to make one revolution for each cycle of the machine and is journalled in the side members 4 of the machine frame (Figure 1) and near either end is machined with an eccentric or crank 274 of small throw, one of which is shown in Figure 10. The crank pins of the cranks 274 are journalled in blocks 275 arranged to be slidable along rods 276 and thus the rods 276 are caused to rock to-and-fro about their pivots 277 once in every revolution of the shaft 272. A smaller block 278 is fixed to each of the rods 272 near their upper ends by set-screws 279 and a horizontal rod 280 is pivoted by a knuckle joint 281 to each of the blocks 278. Thus the rocking movement of the rods 276 is converted to a reciprocating movement of the rods 280 which are guided in bosses 282, each carried by and extending sideways from the horizontal arm 283 of a bell-crank. The rods 280 at opposite ends are coupled together by a bar 284 of T-section. The bell-cranks are mounted to turn about horizontal pivots at 285 and their vertical arms 286 bear follower rollers 287 at their lower ends which bear against cams 288 fixed to the shaft 272 which rotates clockwise as seen in Figure 9. The result of this is that the rocking motion imparted to the bell-cranks 283, 286 causes the forward ends of the two rods 280 to rise and fall in an irregular manner which motion is superposed on that given by the rods 276, the cams 288 being designed to produce the desired path of movement as shown at 271.

The front ends of the rods 280 are bored to receive inner rods 289 with pointed front ends whose position can be exactly adjusted by setting the inner rods 289 in the bores of the outer rods 280. The raking wire 270, already referred to is stretched between the points of the rods 289 to which it is brazed and deformation of the wire 270 is prevented by providing intermediate braces 290 spaced at a suitable pitch and supported at their rear ends on the transverse bar 284. The raking wire 270 is brazed to the front pointed ends of the braces 290.

The gate 136 described above has a number of advantages over the tubes used in a conventional loom. Such tubes are necessary when weaving normal Axminster carpet in order to insert each tuft individually between each corresponding pair of warp threads. In the present instance, however, individual closed tubes are not required and the gate 136 with the open ducts 137 is more easily threaded.

When a spool intended for use in a conventional loom, is wound in a setting frame, the ends of the yarns are held in a clamp before removal from the frame. This facilitates the threading of the tubes and allows a number of wound spools to be stored without the use of a corresponding number of sets of tubes, which are both delicate and expensive. If a gate or grid with open ducts according to the present invention is used instead of the conventional set of tubes, it can be placed in position on the yarns while the spool is still in the setting frame.

The series of movements through which each spool is passed depends on the direction of movement of the cam followers along the tracks, and it is clear therefore that the necessary sequence can only be obtained for a single direction of motion of the chain. When producing a fabric with a symmetrical repeat, therefore, it is necessary to provide one spool for each row of the repeat instead of providing one spool for each row in half of the repeat and then reversing the chain to produce the second half. This inevitably leads to a chain of double the normal length but any disadvantage thereby involved is overcome by causing the chain to pass through several machines in succession. If one of these machines should develop a fault, the remainder need not be put out of action. It is only necessary to stop the operation of the moving electrode and the shearing device by means of the clutch 170 on the faulty machine and the chain can continue in motion while the fault is repaired. As each spool passes through the faulty machine, a row of tufts is laid on the backing, but since the row is not anchored in position it is merely withdrawn by the subsequent movement of the spool which then passes on to the next machine.

In order to avoid all the machines lying idle simultaneously when the yarn on one set of spools is exhausted, a spare chain may be used. As soon as the yarn on the spools of the first chain is exhausted the first chain is uncoupled at one point and the spare chain, loaded in advance with wound spools, is coupled to it. Thus as the operation continues, the spare chain is drawn into the circuit and the first chain is withdrawn. As soon as the spare chain is completely in the circuit it is coupled back to itself, and operation continues normally while the original chain is reloaded with full spools.

I claim:

1. A machine for the production of fabric having a tufted surface in which tufts of yarn from a plurality of spools each having a plurality of lengths of yarn wound thereon are attached to a sheet of base material, comprising a chain having mounting means for carrying said spools, gate means for supporting the ends of said lengths of yarn in projecting relation to said mounting means, means for driving said chain in a closed circuit, means for driving material forming a base for said fabric in a path adjacent a run of said chain, means for displacing said mounting means in succession in a direction generally transverse to said run while supported by said chain, means for controlling the angular position of each said gate means during said displacement, whereby the ends of said lengths of yarn are given a composite motion necessary for embodiment in said material, means for securing said yarn ends in said material and means for severing said yarn ends.

2. A machine for the production of fabric having a tufted surface in which tufts of yarn from a plurality of spools each having a plurality of lengths of yarn wound thereon are attached to a sheet of base material, comprising a chain having mounting means for supporting said spools, a plurality of means supporting said chain in a closed circuit, means for driving said chain around said closed circuit, gate means connected to said mounting means for supporting the ends of said lengths of yarn in projecting relation to said spool, a first cam-follower on each said mounting means, a radial arm projecting from each said mounting means and connected to said gate means, means for driving material forming a base for said fabric in a path adjacent a run of said chain between adjacent support means, first cam means cooperating with said first cam-followers for producing lateral displacement of said mounting means over said run of said chain, second cam means cooperating with said second cam-followers for controlling the angular position of said gate means during said displacement, whereby the ends of said lengths of yarn are given a composite motion necessary for embodiment in said material, means for securing said yarn ends in said material, and means for severing said yarn ends.

3. A machine as claimed in claim 2, comprising a frame for rotatably mounting each spool, a pair of said first cam-followers mounted one on each end of said frame on the axis of said spool mounting means, a pair of said radial arms mounted one on each end of said frame, a pair of said second cam-followers on the ends of said radial arms, said first cam means comprising a pair of first guide tracks cooperating with said first cam-followers for producing lateral displacement of said mounting means, and said second cam means comprising a pair of second guide tracks cooperating with said second cam-followers for controlling the angular position of said gate means.

4. A machine for the production of fabric having a tufted surface in which tufts of yarn from a plurality of spools each having a plurality of lengths of yarn wound thereon are attached to a sheet of base material, comprising a chain for supporting said spools, means for driving said chain in a closed circuit, gate means for supporting the ends of said lengths of yarn in projecting relation to said spool to form a row of tufts, fixed anvil means, reciprocable anvil means cooperating with said fixed anvil means and operatively associated with said chain driving means, means for driving material forming a backing for said fabric over said fixed anvil means in a path adjacent a run of said chain, means for coating said backing with adhesive, means for displacing said mounting means in succession in a direction generally transverse to said run toward said fixed anvil means while supported by said chain, means for controlling the angular position of each said gate means, whereby said successive rows of tufts are given a composite motion comprising the steps of laying said row of tufts on said coated backing while said reciprocable anvil grips said row of tufts, withdrawing said spool while said row of tufts is gripped, and moving said gate means in an arc of a circle about the line of gripping by said anvil means, and means for severing said tufts while said gate means moves in said arc.

5. A machine as claimed in claim 4, in which said fixed and reciprocable anvil means are constituted by electrode means and comprising in addition means for supplying high frequency electric current to said electrode means while said row of tufts is gripped.

6. For use in a machine for the production of fabric having a tufted surface, a spool carrier comprising in combination a rectangular frame, means for mounting a spool for rotation in said frame, and a yarn guide mounted on one side of said frame, said yarn guide comprising a base, a plurality of open-topped ducts mounted side-by-side on said base to form a comb-like structure and removable means for enclosing the open tops of said ducts.

7. A machine for the production of carpet having a tufted surface, comprising in combination a plurality of spools, a plurality of lengths of yarn wound on each said spool, gate means for supporting the ends of said lengths of yarn in projecting relation to said spool to form a row of tufts, a chain supporting said spools, means for driving said chain in a closed circuit, fixed anvil means, reciprocable anvil means cooperating with said fixed anvil means and operatively associated with said chain driving means, means for driving material forming a backing for said carpet over said fixed anvil means in a path adjacent a run of said chain, means for coating said backing with adhesive, means for displacing said spools in succession in a direction generally transverse to said run while supported by said chain, means for controlling the angular position of each said spool and gate means, whereby the ends of said row of tufts is given a composite motion necessary for attachment to said backing, said motion including the step of laying said row of tufts on said backing supported by said fixed anvil means, means for raking each successive row of tufts into contact with the previous row, and means for severing said row of tufts.

8. A machine as claimed in claim 7, in which said raking means comprises a wire extending along the length of a row of tufts, support means at the ends of said wire, and means for producing cyclic motion of said wire in a closed path in relation to each row of tufts after said row has been secured to said backing, said cyclic motion consisting of moving said wire forwardly above said row, lowering said wire in front of said row and withdrawing said wire to rake said row into contact with said previous row.

References Cited in the file of this patent

UNITED STATES PATENTS

| | | |
|---|---|---|
| 621,720 | Southwell et al. | Mar. 21, 1899 |
| 668,597 | Wyman | Feb. 19, 1901 |
| 1,513,112 | Holmes | Oct. 28, 1924 |
| 1,864,478 | Ward | June 21, 1932 |
| 1,897,077 | Shuttleworth | Feb. 14, 1933 |
| 2,050,740 | Smith | Aug. 11, 1936 |
| 2,063,221 | Bauer | Dec. 8, 1936 |
| 2,242,864 | Luckhaupt | May 20, 1941 |
| 2,358,368 | Victor | Sept. 19, 1944 |
| 2,385,925 | Linscott | Oct. 2, 1945 |
| 2,497,330 | Smith | Feb. 14, 1950 |
| 2,583,337 | Laing | Jan. 22, 1952 |